Sept. 24, 1963   R. A. MEYERS ETAL   3,105,145
FUNCTION CONTROL UNIT (DIFFERENCE IN ABSOLUTE MAGNITUDE METHOD)
Filed Jan. 19, 1959   5 Sheets-Sheet 1

INVENTOR
R. A. MEYERS
H. B. O. DAVIS
W. E. DIETRICH

BY

ATTORNEY

Sept. 24, 1963  R. A. MEYERS ETAL  3,105,145
FUNCTION CONTROL UNIT (DIFFERENCE IN ABSOLUTE MAGNITUDE METHOD)
Filed Jan. 19, 1959  5 Sheets-Sheet 3

INVENTOR
R. A. MEYERS
H. B. O. DAVIS
W. E. DIETRICH

BY
ATTORNEY

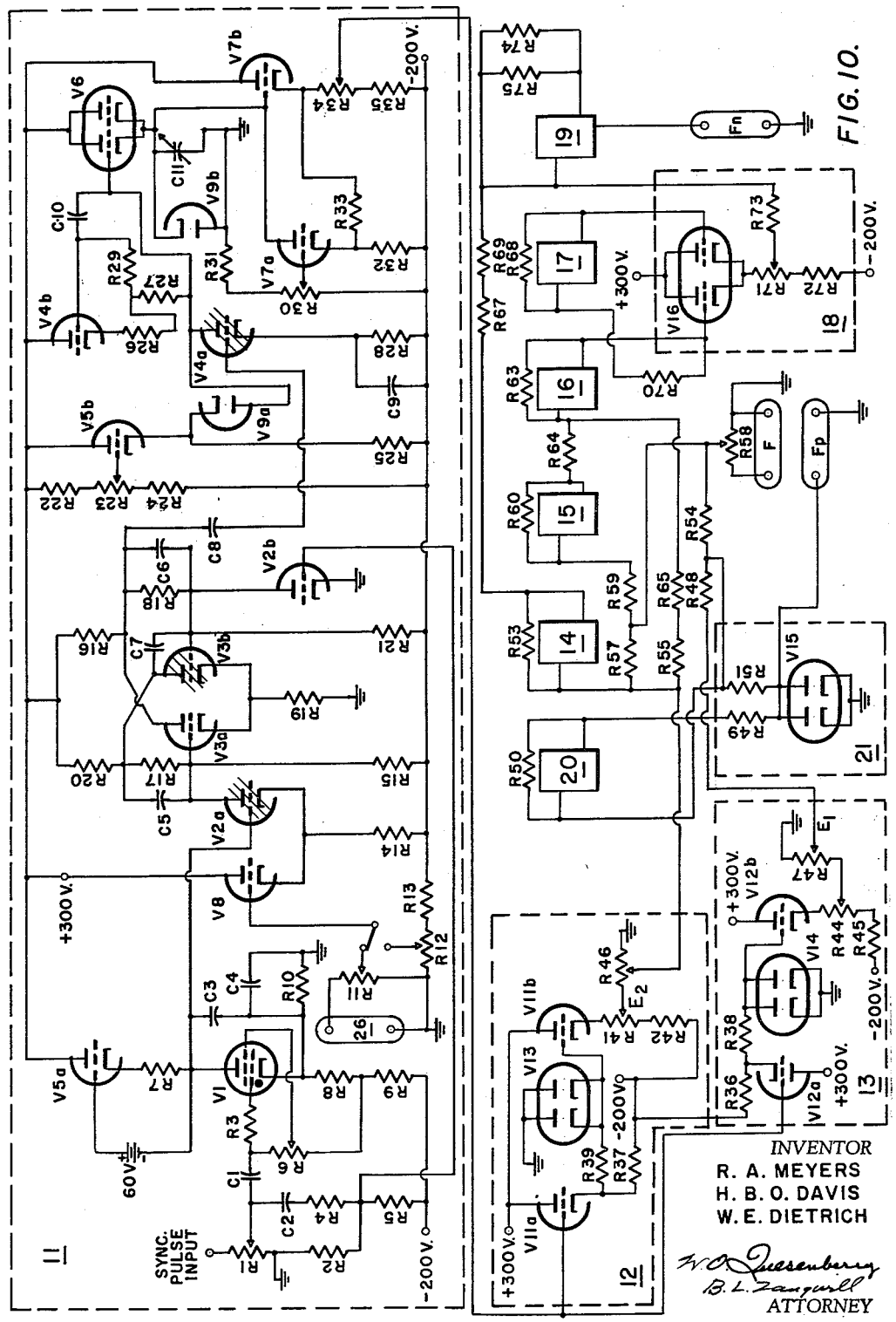

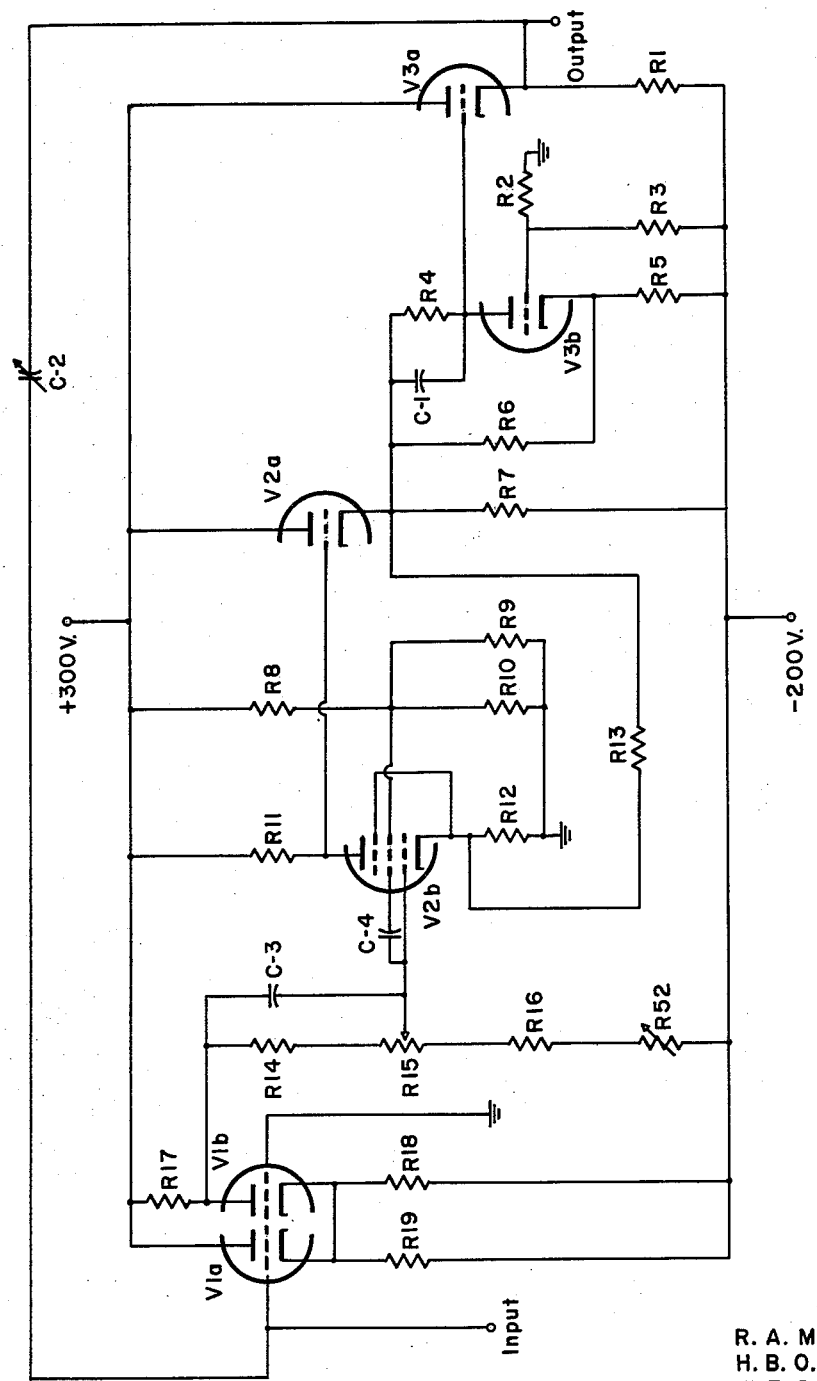
FIG. II.

United States Patent Office 3,105,145
Patented Sept. 24, 1963

3,105,145
FUNCTION CONTROL UNIT (DIFFERENCE IN ABSOLUTE MAGNITUDE METHOD)
Robert A. Meyers, Silver Spring, Md., Henry B. O. Davis, Indialantic-by-the-Sea, Melbourne, Fla., and Wallace E. Dietrich, Baltimore, Md., assignors to the United States of America as represented by the Secretary of the Navy
Filed Jan. 19, 1959, Ser. No. 787,783
8 Claims. (Cl. 235—193)
(Granted under Title 35, U.S. Code (1952), sec. 266)

The invention described herein may be manufactured and used by or for the Government of the United States of America for governmental purposes without the payment of any royalties thereon or therefor.

This invention relates to a function control unit (difference in absolute magnitude method) for simulating static and dynamic conditions of a ship under various degrees of loading, heave, roll, or pitch.

The invention is primarily used to perform mathematical operations on the output of a function generator, such as an "Electronic Curve Tracing Device," Patent No. 2,845,572, issued July 29, 1958, by W. E. Dietrich, Jr., to produce modified electrical waveforms which simulate the actual performance of the ship.

The apparatus of the invention may be used to replace function control units 31–35 of copending patent application Serial No. 370,901, filed 28 July 1953, Patent No. 2,955,762, issued 11 October 1960, entitled "Representation and Measurement of Physical Entities Electrically" by W. E. Dietrich, Jr., while allowing more flexible methods of operation.

The primary object of this invention, therefore, is to provide a method and apparatus for modifying a waveform proportional to a ship hull shape to produce an output which simulates the performance of a ship in actual operation.

Another object of this invention is to provide a method and apparatus for modifying a hull shape waveform at any speed up to at least 200 times per second without generating transients or noise in the output.

Other objects and advantages of the invention will hereinafter become more fully apparent from the following description of the annexed drawings, which illustrate a preferred embodiment, and wherein:

FIG. 10 is a schematic diagram of the function control unit of FIG. 7; and

Figure 9:
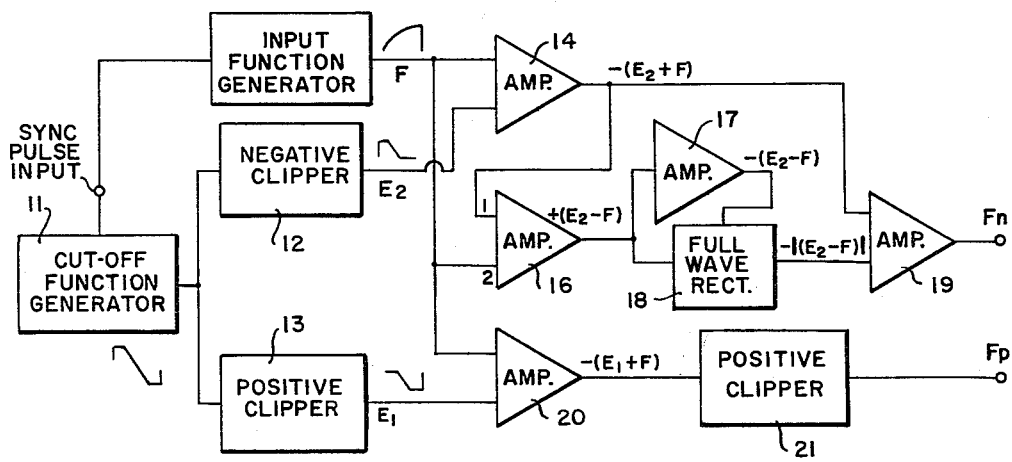
FIG. 9 is a block diagram of the function control unit illustrating another method of calculation.
Figure 7:
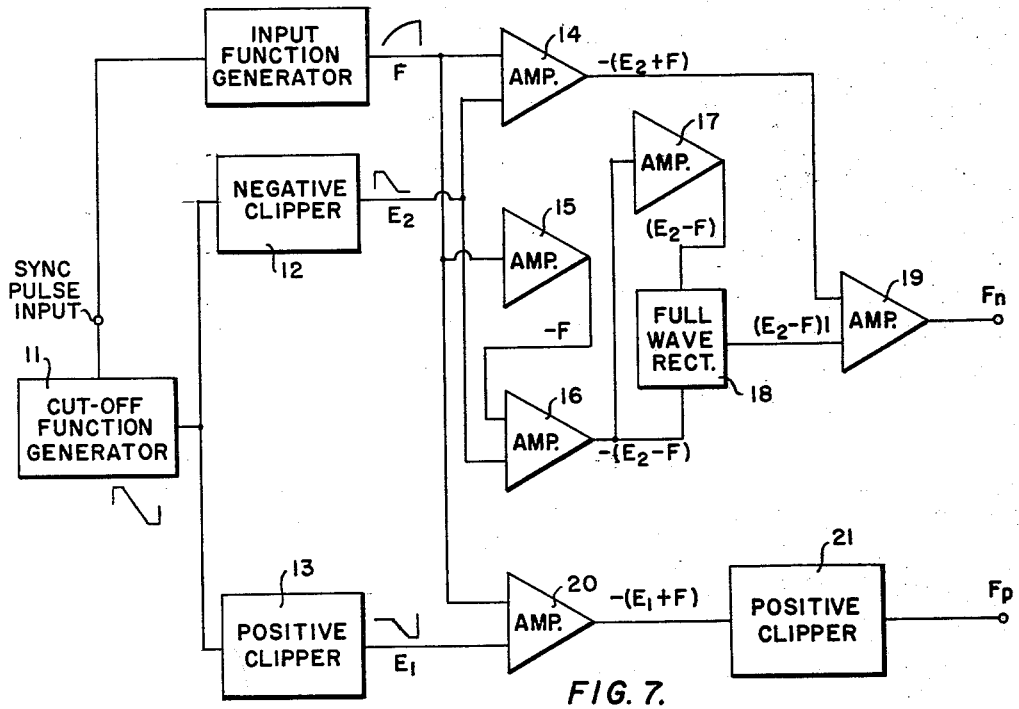
FIG. 7 is a block diagram of the function control unit.

FIG. 11 is a schematic diagram of amplifiers 14–17, 19 and 20 utilized in the function control units of FIGS. 7 and 9.

Figure 1:
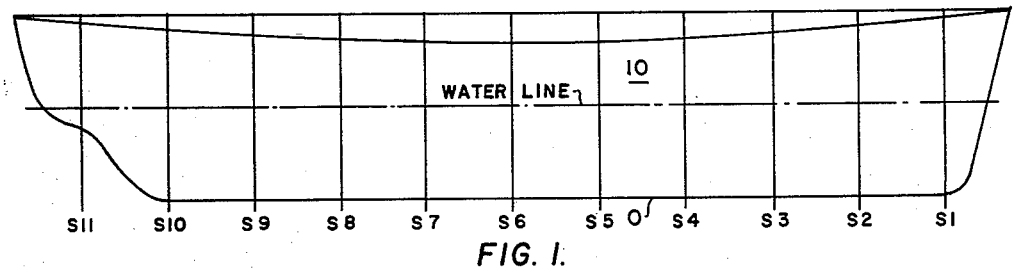
FIG. 1 is a view of a ship having equally spaced transverse cross-section hull lines S1 through S11.

Referring now to the drawings, wherein like reference characters designate like or corresponding parts throughout the several views, there is shown in FIG. 1 a ship 10 having a keel at 0, a sloping deck, and a number of spaced transversed cross-section or station lines S1 through S11.

Figure 2:
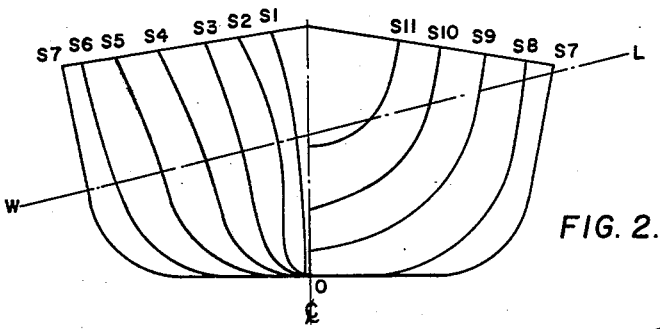
FIG. 2 is a stern view of the ship showing the shape of the cross-sectional lines and a typical heeled waterline WL.

Referring to FIG. 2, a stern view of the ship 10 is shown by drawing the cross-section lines and a typical heeled water line WL.

Figure 3:
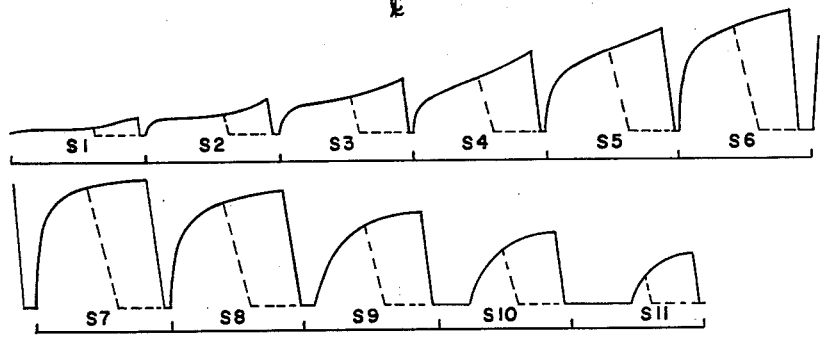
FIG. 3 is a diagram of the function generator output for the ship shown in FIG. 1.

These cross-section lines S1–S11 are scanned in sequence by a function generator, and a wave train, illustrated by the solid lines of FIG. 3, appears at the output of the function generator. Each pattern (S1–11) of the wave train shown in FIG. 3 represents the shape of one-half of a correspondingly numbered cross-section or station line (S1–11) of FIG. 1.

For stability investigations, it is necessary to calculate the transverse area of the cross-sections up to the waterline. The purpose of the function control unit is to insert any desired waterline as represented by the slope of a cutoff function on the transverse cross-sectional shapes while being able to vary the displacement or the distance from the keel to the waterline. This operation is indicated by the dashed lines on FIG. 3.

Figures 4, 5:
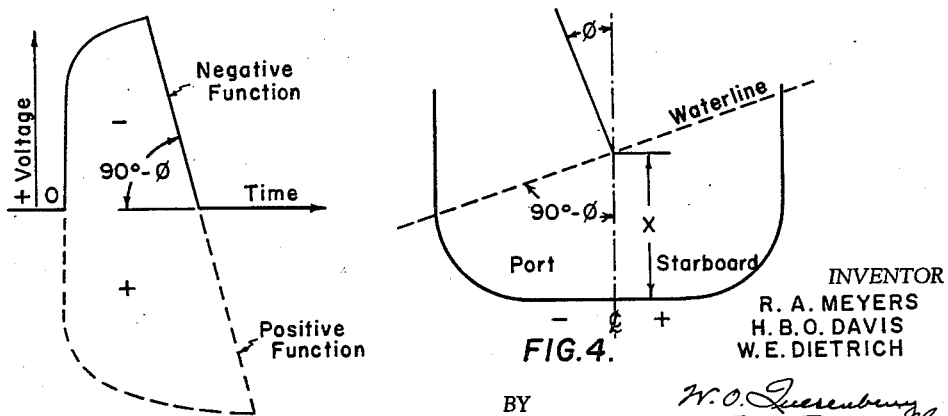
FIG. 4 is a diagram of one transverse cross-section of a ship with a roll of $\phi$ degrees.
FIG. 5 illustrates the shape of the positive and negative functions plotted as a voltage versus time.

The function control unit will also generate a waveform representing each side of the ship. For example, FIG. 4 represents the transverse cross section of a ship with a roll of $\phi$ degrees and at a depth "X" in the water. The port or negative buoyancy side of the ship up to the waterline may be represented by a voltage waveform as shown by the solid line marked "Negative Function" in FIG. 5. This waveform is referred to as the negative function for the side high in the water and the starboard or positive buoyancy side is referred to as the positive function for the side of the ship sitting low in the water.

Figure 6:
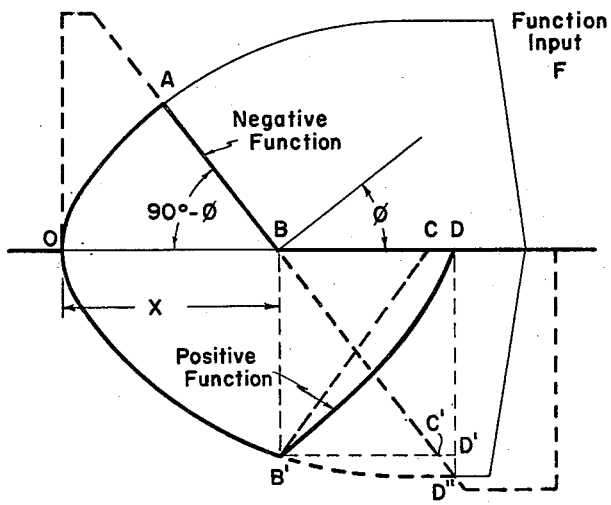
FIG. 6 is a diagram of the relationship between the positive and negative functions and the true cross-section of the ship.

The positive buoyancy side of the ship would be represented by the dashed curve of FIG. 5. Because the straight or waterline portion of the positive function has a reverse slope with respect to time, this waveform cannot be generated as a function of time and displayed on an oscilloscope. Instead, an electrical waveform having the same integral value, which may be made to give the identical information, is generated by the function control unit. This waveform is identical in shape to the original function up to the time that the negative function reaches zero. At this time, the positive function is cut off and drops to zero as the negative function did. These two waveforms are shown in FIG. 6.

If the input function F did not increase in amplitude between times B and C (FIG. 6), the positive function between times B and C would be a linear decrease with the same slope as the negative function between A and B as shown by dotted line B'—C. The input function F increase in amplitude causes the waterline to intersect the ship outline at D". An area corresponding to the integral of the increase in amplitude between B and D is added to the waveform, however, to give the proper integral for the positive function output. The necessity for this correction may be seen from FIG. 6.

In order for the waveform of the positive function to represent accurately the integral of the positive side of the ship, it must include any increase in amplitude between times B and D If the positive function decrease from B' to C were perfectly linear, the waveform would enclose an area equal to the area of the positive side, neglecting the area B'C'D".

Adding in this additional area while dropping from B' to D at a constant rate creates the curved line B'—D to make the area B'CD equal to the area B'C'D".

A number of methods were considered which would give the desired output function with the waterline cut off at the exact time required for each cross section. Basically the techniques considered were to generate a so-called cut-off function with a step rise, adjustable time delay, and linear voltage drop. The output voltage representing the cross-section must then be cutoff at the time that the voltage of the cutoff function equals the voltage of the generated shape function. No satisfactory method was found which had the required accuracy or freedom from switching transients over the full output voltage range. Instead, the instruments was designed along the lines of a computer to solve the equation of the desired output voltage. This method has given an instrument with no switching transients, drifts, or other inaccuracies anticipated with other methods considered.

The operation of the function control unit over one cycle or period of operation for the negative function output is given by the equation:

$$F_n = \tfrac{1}{2}[|(E_2+F)| - |(E_2-F)|]$$

where $E_2$ is the cutoff function (positive half),
F is the input function, and
$F_n$ is the negative function output.

The instrument is therefore a form of computer which generates $E_2$ and, with an input F, solves the above equation to give $F_n$ at the output.

Figure 8:
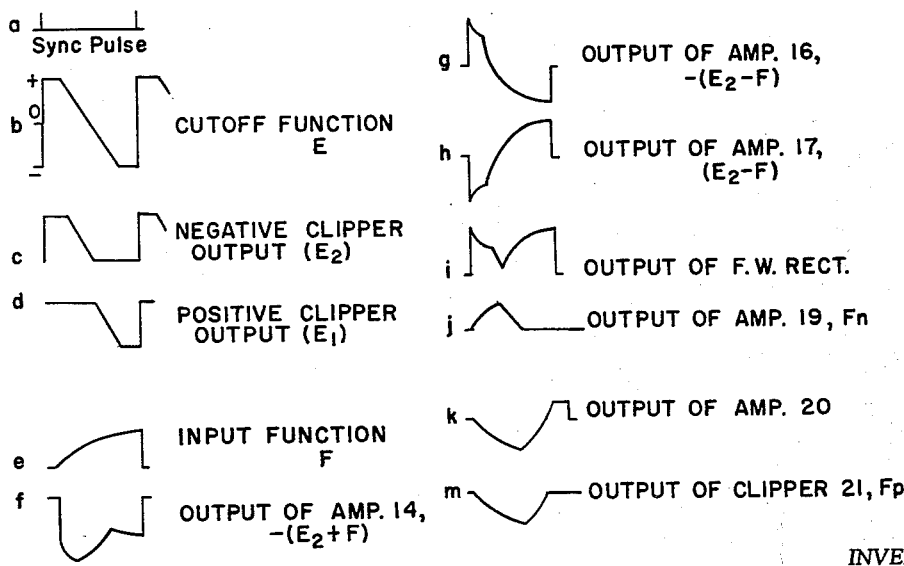
FIG. 8 is a diagram illustrating typical waveforms of the function control unit of FIG. 7.

The positive function $F_p$ is given by the equation $$F_p = (E_1 - F)$$

where $E_1$ is the cutoff function (negative half) and $F_p$ is the positive function output which is clipped to eliminate the positive part of the waveform (see FIG. 8 (m)).

The operation of the function control unit may be understood by referring to the block diagram of FIG. 7 and the waveforms of FIG. 8. The cutoff function generator (block 11) is the term applied to the circuits which control the function limit sweep, cutoff angle, and amplitude. For example, the cutoff function generator 11 supplies a waveform whose slope from positive peak to negative peak represents the angle of the ship's transverse waterline from horizontal. This angle may be varied.

Referring to FIG. 7, an input function generator is shown which generates an input function F, FIG. 8 (e), and a sync. pulse, FIG. 8 (a), which occurs at time 0 to trigger cut-off function E. FIG. 8 (b). The cut-off function generator 11 is connected to negative clipper 12, which has an output $E_2$, FIG. 8 (c), and positive clipper 13, which has an output $E_1$, FIG. 8 (d).

Amplifier 14 is connected to negative clipper 12 and the input function generator to produce an output $-(E_2+F)$, FIG. 8 (f). Amplifier 14 is an inverting amplifier as are 15, 16, 17 19 and 20 shown in FIG. 7. The inverting amplifier 14 produces the output $-(E_2+F)$, which is the first term of the equation of $F_n$.

Amplifier 15 is connected to the input function generator to produce an output $-F$. Amplifier 16 is connected to negative clipper 12 and amplifier 15 to produce an output $-(E_2-F)$, FIG. 8 (g). Amplifier 17 is connected to the output of amplifier 16 to produce an output $(E_2-F)$, FIG. 8 (h).

A full wave rectifier 18 is connected to the output of amplifiers 16 and 17 to produce an output $|(E_2-F)|$, FIG. 8 (i), which is the absolute value of $(E_2-F)$ and the second term of the equation of $F_n$.

Amplifier 19, having a gain of $\tfrac{1}{2}$, is connected to the output of amplifier 14 and the output of the full wave rectifier 18 to produce the negative function $F_n$, FIG. 8 (j).

Amplifier 20 is connected to the output of the input functon generator and the positive clipper 13, to produce an output $-(E_1+F)$, FIG. 8 (k). Positive clipper 21 is connected to the output of amplifier 20 to produce the positive function $F_p$, FIG. 8 (m).

The embodiment of FIG. 7 has been used for symmetrical shapes and thereby requires only one input function generator. However, the input function generator input to amplifier 20 may be disconnected and a second input generator may be connected to amplifier 20 so that asymmetrical input functions may be used if desired.

Referring to FIG. 9, an alternative method of calculating the negative function is shown which allows amplifier 15 to be eliminated. Amplifier 16 is connected to the output of amplifier 14, $-(E_2+F)$, for a gain of 1 and connected to the input function $+F$ for a gain of 2. Therefore the output of amplifier 16 is $$-2F - [-(E_2+F)]$$

or $(E_2-F)$. Amplifier 17 produces $-(E_2-F)$ from the connection to amplifier 16. Full wave rectifier 18 is connected to amplifiers 16 and 17 and produces $|(E_2-F)|$. Amplifier 19 then produces $F_n$ and the positive function $F_p$ is produced as in FIG. 7.

A schematic diagram of the system of FIG. 7 is drawn in FIG. 10 with the amplifiers drawn in block form and illustrated in FIG. 11.

The cut-off function generator 11 is set off by the dashed lines as are the other blocks of FIG. 7. The sync pulse input is applied to the grid of thyratron V1 which forms, along with capacitor C3 and constant current charge tube V5a, a sawtooth waveform generator whose output is applied to the grid of a triode V2a. Tube V2a, which is normally turned on, is cut-off by the sawtooth waveform from thyratron V1 and, in conjunction with the sync pulse applied to the grid of triode V2b, triggers a flip-flop stage including triodes V3a and V3b connected to the plate circuit of tube V2b, turning V3a on and V3b off.

The drop in voltage at the plate of V3a turns triode V4a off and allows the circuits of tubes V4b, V9a, and V5b to apply a constant high voltage to the grid of a switching tube V6. V6 charges up capacitor C11 to a constant high voltage in a short period of time, which voltage is applied to cut off a cathode follower V7b of the function generator 11.

The constant charging of capacitor C3 by tube V5a raises the voltage at the grid of trigger V2a until, at a point determined by the input to V8 corresponding to the displacement or "X" distance on FIG. 4, V2a conducts which tends to cut off V3a and retrigger the flip-flop stage. The rise in voltage at the plate of tube V3a turns tube V4a on which turns switching tube V6 off. Capacitor C11 discharges to zero, where it is clamped by a diode V9b, through constant current tube V7a at a rate determined by a resistor R30, after which the circuit remains at rest until another sync pulse arrives.

The slope of the cut-off function and therefore angle $\phi$, as shown in FIG. 4, depends on the setting of R30. The depth or "X" distance depends on the manual setting of resistor R12 or may be performed automatically by applying a voltage input at terminal 26 connected to the grid of tube V8 proportional to X along the length of the ship.

The cut-off function is applied to a negative clipper 12 comprising cathode follower tubes V11a and V11b and clipper tube V13 and a positive clipper 13 comprising cathode follower tubes V12a and V12b and clipper tube V14.

The positive and negative cut-off functions $E_1$ and $E_2$ and the function input F are fed to amplifiers 14-17, 19, and 20, positive clipper 21, and full wave rectifier 18 (comprising tube V16) by means of large resistors R48, R54, R55, R57, R59 and R65 (about 1 megohm). Feedback resistors R50, R53, R60, R63, R68, R74, and R75 stabilize the amplifiers and set the gain to 1 or $\tfrac{1}{2}$ as the case may be. If the gain of the amplifiers is large (10,000 in this case), the accuracy for addition and subtraction depends on the matching accuracy of the input and feedback resistors (within .1% in this case).

Referring to FIG. 11, a schematic diagram of the amplifiers is shown. A first cathode follower V1a is cathode coupled to a cathode driven, grounded grid amplifier V1b. V1b is connected to pentode amplifier V2b which is in turn connected to cathode follower V2a. V3a is a cathode follower output tube connected to V2a by means of constant current coupling tube V3b. R13 provides a positive feedback path for maximum gain with stability while C2 provides a negative feedback path for optimum high frequency response.

An operative embodiment of the function control unit of FIG. 10 employed the following typical values:

| | | |
|---|---|---|
| R1 | ohms | 100K |
| R2 | do | 47K |
| R3 | do | 27K |
| R4 | do | 220K |
| R5 | do | 220K |
| R6 | do | 270K |
| R7 | do | 120K |
| R8 | do | 10K |
| R9 | do | 100K |
| R10 | do | 100K |
| R11 | do | 100K |
| R12 | do | 100K |
| R13 | do | 100K |
| R14 | do | 220K |
| R15 | megohms | 1 |
| R16 | ohms | 20K |
| R17 | do | 470K |
| R18 | do | 470K |
| R19 | do | 12K |
| R20 | do | 20K |
| R21 | megohms | 1 |
| R22 | ohms | 100K |
| R23 | do | 200K |
| R24 | do | 120K |
| R25 | do | 120K |
| R26 | do | 2K |
| R27 | do | 100K |
| R28 | do | 1K |
| R29 | do | 270K |
| R30 | do | 30K |
| R31 | do | 150K |
| R32 | do | 47K |
| R33 | megohms | 3.3 |
| R34 | ohms | 100K |
| R35 | do | 120K |
| R36 | do | 220K |
| R37 | do | 220K |
| R38 | do | 500K |
| R39 | do | 500K |
| R41 | do | 10K |
| R42 | do | 180K |
| R44 | do | 10K |
| R45 | do | 180K |
| R46 | do | 100K |
| R47 | do | 100K |
| R48 | megohms | 1 |
| R49 | ohms | 100K |
| R50 | megohms | 1 |
| R51 | do | 1 |
| R52 | ohms | 50K |
| R53 | megohms | 1 |
| R54 | do | 1 |
| R55 | do | 1 |
| R57 | do | 1 |
| R58 | ohms | 100K |
| R59 | megohms | 1 |
| R60 | do | 1 |
| R63 | do | 1 |
| R64 | do | 1 |
| R65 | do | 1 |
| R67 | ohms | 50K |
| R68 | megohms | 1 |
| R69 | do | 1 |
| R70 | do | 1 |
| R71 | ohms | 10K |
| R72 | do | 180K |
| R73 | megohms | 1 |
| R74 | do | 1 |
| R75 | do | 1 |
| C1 | micro-micro-farads | 100 |
| C2 | do | 100 |
| C3 | micro-farads | 0.9 |
| C4 | do | 8 |
| C5 | micro-micro-farads | 20 |
| C6 | do | 20 |
| C7 | do | 100 |
| C8 | micro-farads | 0.25 |
| C9 | do | 25 |
| C10 | do | 0.25 |
| C11 | do | .01–.10 |
| V1 | | 2D21 |
| V2 | | 12AX7 |
| V3 | | 12AX7 |
| V4 | | 12AX7 |
| V5 | | 12AX7 |
| V6 | | 12AX7 |
| V7 | | 12AX7 |
| V8 | | ½—12AU7 |
| V9 | | 6AL5 |
| V11 | | 12AX7 |
| V12 | | 12AX7 |
| V13 | | 6AL5 |
| V14 | | 6AL5 |
| V15 | | 6AL5 |
| V16 | | 12AX7 |

An operative embodiment of the amplifier of FIG. 11 employed the following typical values:

| | | |
|---|---|---|
| R1 | ohms | 40K |
| R2 | do | 82K |
| R3 | do | 18K |
| R4 | do | 270K |
| R5 | do | 82K |
| R6 | megohms | 3.3 |
| R7 | ohms | 270K |
| R8 | do | 50K |
| R9 | do | 27K |
| R10 | do | 27K |
| R11 | do | 680K |
| R12 | do | 1K |
| R13 | do | 180K |
| R14 | megohms | 2 |
| R15 | do | 0.5 |
| R16 | do | 2 |
| R17 | ohms | 470K |
| R18 | do | 220K |
| R19 | do | 220K |
| C1 | micro-micro-farads | 15 |
| C2 | do | 3–12 |
| C3 | do | 10 |
| C4 | do | 50 |
| V1 | | 12AX7 |
| V2 | | 6U8 |
| V3 | | 12AT7 |

The accuracy of the desired output function is excellent, because the means used to generate the output function is primarily that of simple addition and subtraction.

There is no distortion of the output function due to the transition point and there are no transient pulses generated at the cross-over point.

The output waveform is at the same D.C. level as the input, with no level or gain change, although gain could be added if desired.

The frequency response is from D.C. to the frequency limit of the amplifiers used (about 200 c.p.s.).

There is negligible drift due to the use of stable operational amplifiers.

It should be understood, of course, that the foregoing disclosure relates to only preferred embodiments of the invention and that it is intended to cover all changes and modifications of the examples of the invention herein

What is claimed is:

1. A function control unit for modifying a recurring electrical waveform proportional to a ship's hull shape comprising a generator for generating a cut-off function proportional to an arbitrary waterline of said ship, a negative clipper connected to said generator for producing a first cut-off function proportional to the waterline of the side of the ship high in the water, a first mixer connected to said negative clipper and to said generator for combining said hull waveform and first cut-off function to produce a first negative output proportional to the smaller absolute value of said waveform and first cut-off function, a positive clipper connected to said generator for clipping said cut-off function to produce a second cut-off function proportional to the side of said ship low in the water, and a second mixer connected to said positive clipper and to said generator for combining said hull waveform and second cut-off function to produce a second negative output proportional to the absolute difference between said waveform and second cut-off function.

2. A function control unit according to claim 1 and further characterized by said first mixer comprising a first amplifier connected to said negative clipper for producing a negative output proportional to the sum of said waveform and first cut-off function, a second amplifier having means for producing a negative output proportional to said waveform, a third amplifier connected to said negative clipper and second amplifier for producing a negative output proportional to the difference between said first cut-off function and waveform, a fourth amplifier connected to said third amplifier for producing a positive output proportional to the difference between said first cut-off function and waveform, a full wave rectifier connected to said third and fourth amplifiers for producing an output proportional to the absolute magnitude of the difference between said first cut-off function and waveform, and a fifth amplifier connected to said full wave rectifier and first amplifier for producing an output proportional to the smaller absolute value of said waveform and first cut-off function.

3. A function control unit according to claim 1 and further characterized by said first mixer comprising a first amplifier connected to said negative clipper for producing a negative output proportional to the sum of said waveform and said cut-off function, a second amplifier connected to the output of said first amplifier for producing a positive output proportional to the difference between said first cut-off function and waveform, a third amplifier connected to said second amplifier for producing a negative output proportional to the difference between said first cut-off function and waveform, a full wave rectifier connected to said second and third amplifiers for producing an output proportional to the absolute magnitude of the difference between said first cut-off function and waveform, and a fourth amplifier connected to said full wave rectifier and first amplifier for producing an output proportional to the smaller absolute value of said waveform and first cut-off function.

4. A function control unit according to claim 1 and further characterized by said second mixer comprising an amplifier connected to said positive clipper for producing a negative output proportional to the difference between said second cut-off function and waveform and an output clipper connected to said amplifier for passing only a negative output from said amplifier.

5. A function control unit for simulating static and dynamic conditions of a ship, comprising waveform generating means for generating an electrical waveform proportional to the outline of a transverse cross section of the hull of said ship; waveform cutoff generating means for cutting off said electrical waveform at points thereof corresponding to the location of the ship's water line on said transverse cross section, and adding means connected to said waveform generating means and to said cutoff generating means for additively combining the respective outputs thereof to produce a waveform proportional to the area of said transverse cross section below said waterline.

6. A function control unit for simulating static and dynamic conditions of a surface ship, comprising input waveform generating means for generating an input waveform corresponding to the transverse cross sectional outline of the ship's hull; cutoff waveform generating means for producing a waveform having a slope from positive peak-to-negative peak corresponding to an arbitrary angular deviation of the ship's waterline from horizontal; first means for combining said input waveform and the positive portion of said cutoff waveform for producing an output waveform having an area proportional to the lesser area of said transverse cross section of the hull below the waterline on one side of the ship's centerline; and second means for combining said input waveform and the negative portion of said cutoff waveform for producing another waveform proportional to the greater area of said transverse cross section below the waterline on the other side of the ship's centerline.

7. Apparatus according to claim 6 but further characterized by said first means comprising a negative clipper connected to said cutoff waveform generating means, and amplifying means connected to said negative clipper and to said input waveform generating means for producing an output waveform representative of said lesser area; and said second means comprising a positive clipper connected to said cutoff waveform generating means, and amplifying means connected to said positive clipper and to said input waveform generating means for producing an output waveform proportional to said greater area.

8. Apparatus according to claim 6 but further comprising means connected to said input waveform generating means for varying the shape of said input waveform whereby the effect of pitching of said ship may be simulated.

References Cited in the file of this patent

UNITED STATES PATENTS

| | | |
|---|---|---|
| 2,783,453 | Rose | Feb. 26, 1957 |
| 2,809,290 | Kee | Oct. 8, 1957 |
| 2,831,107 | Raymond et al. | Apr. 15, 1958 |
| 2,896,165 | Horning et al. | July 21, 1959 |
| 2,934,267 | Wirkler et al. | Apr. 26, 1960 |

OTHER REFERENCES

Reswick: Scale Factors for Analog Computers, Product Engineering (March 1954), p. 197.

Hori: Basic Simulation Techniques, Automatic Control (May 1957), p. 30 to end of article.